(12) United States Patent
Okamoto

(10) Patent No.: US 7,899,182 B2
(45) Date of Patent: Mar. 1, 2011

(54) DIGITAL BROADCAST RECEPTION APPARATUS

(75) Inventor: Kenji Okamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 896 days.

(21) Appl. No.: 11/819,319

(22) Filed: Jun. 26, 2007

(65) Prior Publication Data

US 2008/0123847 A1 May 29, 2008

(30) Foreign Application Priority Data

Jun. 26, 2006 (JP) .............................. 2006-175433

(51) Int. Cl.
*H04N 7/167* (2006.01)
(52) U.S. Cl. ...................... 380/210; 380/211; 380/212; 380/213; 380/214
(58) Field of Classification Search .......... 380/210–214
See application file for complete search history.

(56) References Cited

U.S. PATENT DOCUMENTS

| | | | | |
|---|---|---|---|---|
| 5,392,352 A | * | 2/1995 | Han ............................ | 380/237 |
| 5,787,179 A | * | 7/1998 | Ogawa et al. ................. | 380/46 |
| 6,650,659 B1 | * | 11/2003 | Hamada et al. ............. | 370/487 |
| 7,391,866 B2 | * | 6/2008 | Fukami et al. ............... | 380/210 |
| 7,590,241 B2 | * | 9/2009 | Akiyama et al. ............. | 380/210 |
| 2002/0015400 A1 | * | 2/2002 | Morinaga et al. ........... | 370/345 |
| 2002/0041579 A1 | * | 4/2002 | Tanno et al. ................. | 370/335 |
| 2003/0115594 A1 | * | 6/2003 | Koo et al. ...................... | 725/31 |
| 2003/0123662 A1 | * | 7/2003 | Jo et al. ....................... | 380/213 |
| 2003/0133051 A1 | * | 7/2003 | Oishi et al. .................. | 348/735 |
| 2003/0154377 A1 | * | 8/2003 | Hirai et al. ................... | 713/176 |
| 2004/0196869 A1 | * | 10/2004 | Tsuchida et al. ............ | 370/468 |
| 2006/0034273 A1 | * | 2/2006 | Tamura ....................... | 370/389 |

FOREIGN PATENT DOCUMENTS

| | | |
|---|---|---|
| JP | 5-168019 A | 7/1993 |
| JP | 6-153195 A | 5/1994 |
| JP | 9-64847 A | 3/1997 |
| JP | 2004-363976 A | 12/2004 |

* cited by examiner

*Primary Examiner*—Nabil M El Hady
(74) *Attorney, Agent, or Firm*—Crowell & Moring LLP

(57) ABSTRACT

Disclosed is a digital broadcast reception apparatus which performs a scramble judgment by obtaining a judgment PID corresponding to PCR_PID and a judgment packet corresponding to the judgment PID and judging whether the judgment packet is obtained within a first time, subsequently by a value of tsc bit, subsequently by detecting a PES packet where payload starts and judging whether it is detected within a second time, subsequently by detecting packet_start_code_prefix and judging based on the detected value, and subsequently by a value of PES_scrambling_control.

2 Claims, 5 Drawing Sheets

DIGITAL BROADCAST RECEPTION APPARATUS

BACKGROUND OF THE INVENTION

1. Field of the Invention

The present invention relates to a digital broadcast reception apparatus.

2. Description of Related Art

The subchannels included in the broadcast data of digital broadcasts are classified into free view channels and paid channels, and generally the video data and the audio data of the paid subchannels are encoded (hereinafter referred to as scrambled) so that only viewers who pay viewing fees can view the subchannel. Because the broadcast data includes mixed data of a non-scrambled subchannel and a scrambled subchannel, if an arbitrary subchannel is tuned, the scrambled subchannels that cannot be viewed are frequently tuned. Accordingly, for example, a digital broadcast reception apparatus detecting whether broadcast data is scrambled or not to perform channel up/down tuning has been known (see, for example, Japanese Patent Application Laid-Open Publication No. Hei 5-168019).

Moreover, an analog broadcast reception apparatus judging whether broadcast data is scrambled or not by detecting information about whether the broadcast data is scrambled or not, that is included in the vertical blanking interval (VBI) of the broadcast data of an analog broadcast, has been also known (see, for example, Japanese Patent Application Laid-Open Publication No. Hei 9-64847).

Moreover, an analog broadcast reception apparatus descrambling broadcast data using a key pulse included in the VBI of the broadcast data of an analog broadcast has been also known (see, for example, Japanese Patent Application Laid-Open Publication No. Hei 6-153195).

Moreover, a scramble apparatus which scrambles a packet after judging the necessity of the scrambling based on a packet identifier (PID) for identifying each packet included in broadcast data in a digital broadcast has been also known (see, for example, Japanese Patent Application Laid-Open Publication No. 2004-363976).

Now, as the scramble judgment methods for judging whether broadcast data of a digital broadcast is scrambled or not, for example, the following methods have been known:

(a) a method of judging broadcast data is scrambled when an MPEG-2 sequence header cannot be obtained within a predetermined time (for example, 10 seconds) from the start of the decode of video data, (b) a method of judging broadcast data is scrambled when a value other than 0x0 is described in transport_scrambling_control bits in the TS packet headers of both or any of the video data and the audio data of a subchannel, (c) a method of judging broadcast data is scrambled when a value other than 0x0 is described in PES_scrambling_control bits in the MPEG-2 Packetized Elementary Stream (PES) packets of both or any of the video data and the audio data of a subchannel, (d) a method of judging broadcast data is scrambled when a CA_descriptor exists in the first descriptor description loop of a subchannel, and (e) a method of judging broadcast data is scrambled when the CA_descriptor exists in the second descriptor description loop of a subchannel.

However, the scramble judgment method (a) is actually to start decoding and to judge success/unsuccess of the decoding, and consequently has a problem of taking too much time for the scramble judgment. Moreover, if any of the scramble judgment methods (b)-(e) is adopted as the scramble judgment method, there has been a problem that whether scrambled or non-scrambled cannot be judged accurately because the method to describe the information about whether scrambled or non-scrambled among (b)-(e) is different according to a broadcasting station or region.

SUMMARY OF THE INVENTION

It is one of objects of the present invention to provide a digital broadcast reception apparatus capable of detecting whether a broadcast data is scrambled or not more exactly and more rapidly.

In order to accomplish the above object, according to a first aspect of the invention, a digital broadcast reception apparatus receiving broadcast data of a digital broadcast, comprising: a judgment PID obtainment unit to obtain a PID equivalent to a PCR_PID as a judgment PID, among a VIDEO_PID and an AUDIO_PID in a program map table (PMT) of broadcast data of a subchannel of the digital broadcast; a judgment packet obtainment unit to obtain a TS packet corresponding to the judgment PID obtained by the judgment PID obtainment unit from the broadcast data of the subchannel as a judgment packet; a first scramble judgment unit judging whether or not the judgment packet is obtained by the judgment packet obtainment unit within a first time after the judgment packet obtainment unit starts the obtainment of the judgment packet, wherein when the first scramble judgment unit judges that the judgment packet has not obtained within the first time, the first scramble judgment unit judges that the broadcast data of the subchannel is scrambled; a second scramble judgment unit to judge whether transport_scrambling_control bits of the judgment packet are 0x0 or not when the first scramble judgment unit judges that the judgment packet has been obtained in the first time by the judgment packet obtainment unit, wherein when the second scramble judgment unit judges that the transport_scrambling_control bits of the judgment packet are other than 0x0, the second scramble judgment unit judges that the broadcast data of the subchannel is scrambled; a packet head detection unit to detect a PES packet having a payload_unit_start_indicator of 1 when the second scramble judgment unit judges that the transport_scrambling_control bits of the judgment packet are 0x0; a third scramble judgment unit judging whether or not the PES packet is detected by the packet head detection unit within a second time after the packet head detection unit starts the detection of the PES packet, wherein when the third scramble judgment unit judges that the PES packet has not been detected within the second time, the third scramble judgment unit judges that the broadcast data of the subchannel is scrambled; a head position detection unit to detect a packet_start_code_prefix of the PES packet when the third scramble judgment unit judges that the PES packet has been detected within the second time; a fourth scramble judgment unit to judge that the broadcast data of the subchannel is scrambled when the packet_start_code_prefix detected by the head position detection unit is other than 0x000001; a fifth scramble judgment unit to judge whether PES_scrambling_control is 0x0 or not when the fourth scramble judgment unit judges that the packet_start_code_prefix detected by the head position detection unit is 0x000001, wherein when the fifth scramble judgment unit judges that the PES_scrambling_control is other than 0x0, the fifth scramble judgment unit judges that the broadcast data of the subchannel is scrambled, and when the fifth scramble judgment unit judges that the PES_scrambling_control is 0x0, the fifth scramble judgment unit judges that the broadcast data of the subchannel is non-scrambled; and a tuning control unit to control the judgment PID obtainment unit, the judgment packet obtainment unit, the first scramble judgment unit, the second scramble judgment unit, the packet head detection unit, the third scramble judgment unit, the head position detection unit, the fourth scramble judgment unit, and the fifth scramble judgment unit, so as to perform a scramble judgment at a time of tuning the subchannel from the broadcast data of the digital broadcast, wherein when the tuning control unit judges by the scramble judgment that the broadcast data of the subchannel is scrambled, the tuning control unit tunes a subchannel upper or lower by one than the subchannel.

In the first aspect, it becomes possible to detect more accurately whether the broadcast data of the subchannel is scrambled or not. Furthermore, it becomes possible to recognize whether the broadcast data of the subchannel is scrambled or not without decoding the broadcast data of the subchannel. Consequently, it becomes possible to detect whether scrambled or not more rapidly.

Furthermore, by providing the tuning control unit, only non-scrambled broadcast data of a subchannel is subjected to a decode processing. Consequently, it becomes possible to reduce a processing time for decoding a scrambled subchannel.

According to a second aspect of the invention, a digital broadcast reception apparatus receiving broadcast data of a digital broadcast, comprising: a judgment PID obtainment unit to obtain a PID equivalent to a PCR_PID as a judgment PID, among a VIDEO_PID and an AUDIO_PID in a program map table (PMT) of broadcast data of a subchannel of the digital broadcast; a judgment packet obtainment unit to obtain a TS packet corresponding to the judgment PID obtained by the judgment PID obtainment unit from the broadcast data of the subchannel as a judgment packet; a first scramble judgment unit judging whether or not the judgment packet is obtained by the judgment packet obtainment unit within a first time after the judgment packet obtainment unit starts the obtainment of the judgment packet, wherein when the first scramble judgment unit judges that the judgment packet has not obtained within the first time, the first scramble judgment unit judges that the broadcast data of the subchannel is scrambled; a second scramble judgment unit to judge whether transport_scrambling_control bits of the judgment packet are 0x0 or not when the first scramble judgment unit judges that the judgment packet has been obtained in the first time by the judgment packet obtainment unit, wherein when the second scramble judgment unit judges that the transport_scrambling_control bits of the judgment packet are other than 0x0, the second scramble judgment unit judges that the broadcast data of the subchannel is scrambled; a packet head detection unit to detect a PES packet having a payload_unit_start_indicator of 1 when the second scramble judgment unit judges that the transport_scrambling_control bits of the judgment packet are 0x0; a third scramble judgment unit judging whether or not the PES packet is detected by the packet head detection unit within a second time after the packet head detection unit starts the detection of the PES packet, wherein when the third scramble judgment unit judges that the PES packet has not been detected within the second time, the third scramble judgment unit judges that the broadcast data of the subchannel is scrambled; a head position detection unit to detect a packet_start_code_prefix of the PES packet when the third scramble judgment unit judges that the PES packet has been detected within the second time; a fourth scramble judgment unit to judge that the broadcast data of the subchannel is scrambled when the packet_start_code_prefix detected by the head position detection unit is other than 0x000001; and a fifth scramble judgment unit to judge whether PES_scrambling_control is 0x0 or not when the fourth scramble judgment unit judges that the packet_start_code_prefix detected by the head position detection unit is 0x000001, wherein when the fifth scramble judgment unit judges that the PES_scrambling_control is other than 0x0, the fifth scramble judgment unit judges that the broadcast data of the subchannel is scrambled, and when the fifth scramble judgment unit judges that the PES_scrambling_control is 0x0, the fifth scramble judgment unit judges that the broadcast data of the subchannel is non-scrambled.

In the second aspect, it becomes possible to detect more accurately whether the broadcast data of the subchannel is scrambled or not. Furthermore, it becomes possible to recognize whether the broadcast data of the subchannel is scrambled or not without decoding the broadcast data of the subchannel. Consequently, it becomes possible to detect whether scrambled or not more rapidly.

Preferably, the apparatus of the second aspect further comprises a tuning control unit to control the judgment PID obtainment unit, the judgment packet obtainment unit, the first scramble judgment unit, the second scramble judgment unit, the packet head detection unit, the third scramble judgment unit, the head position detection unit, the fourth scramble judgment unit, and the fifth scramble judgment unit, so as to perform a scramble judgment at a time of tuning the subchannel from the broadcast data of the digital broadcast, wherein when the tuning control unit judges by the scramble judgment that the broadcast data of the subchannel is scrambled, the tuning control unit tunes a subchannel upper or lower by one than the subchannel.

By doing so, only non-scrambled broadcast data of a subchannel is subjected to a decode processing. Consequently, it becomes possible to reduce a processing time for decoding a scrambled subchannel.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF PREFERRED EMBODIMENTS

In the following, the best mode for implementing the digital broadcast reception apparatus according to the present invention will be described in detail with reference to the attached drawings.

Figure 1:
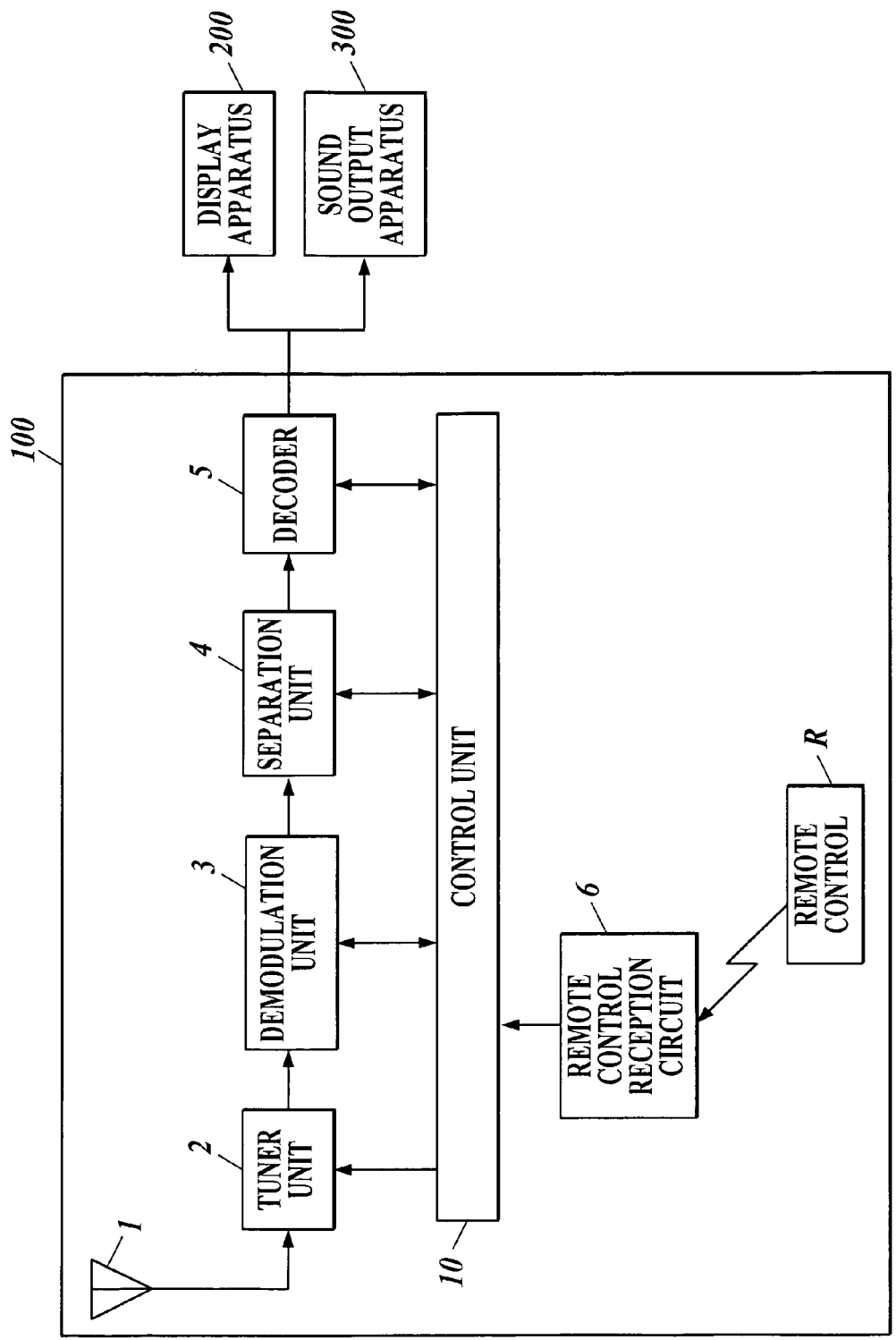
FIG. 1 is a diagram showing the schematic configuration of a digital broadcast reception apparatus according to the present embodiment.
Figure 2:
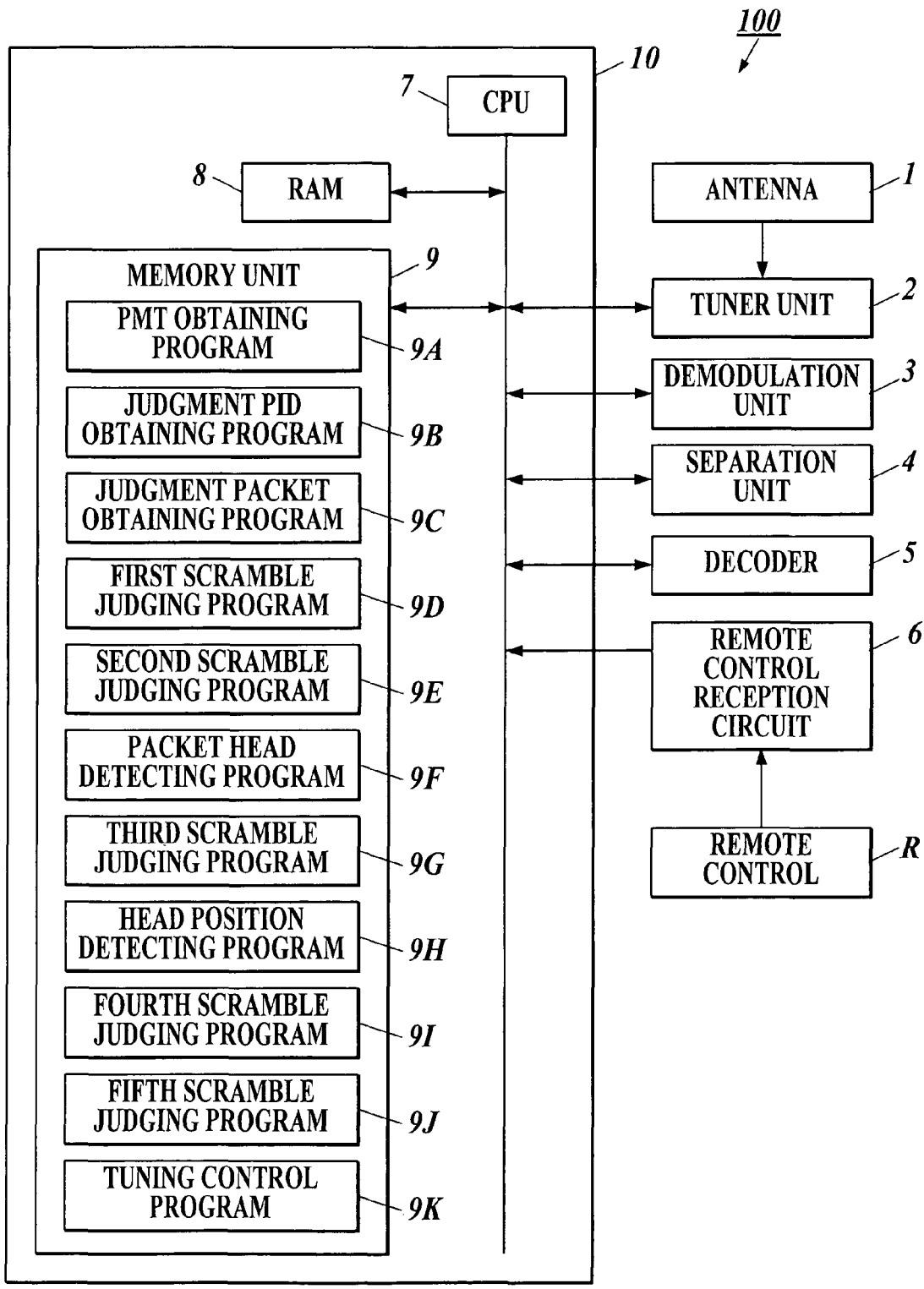
FIG. 2 is a block diagram showing the configuration of the digital broadcast reception apparatus according to the present embodiment.

First, the configuration of a digital broadcast reception apparatus 100 according to the present embodiemnt will be described with reference to FIGS. 1 and 2. The digital broadcast reception apparatus 100 according to the present embodiment includes, for example, an antenna 1, a tuner unit 2, a demodulation unit 3, a separation unit 4, a decoder 5, a remote control reception circuit 6, a remote controller (herein after referred to as remote control) R, a control unit 10, and the like as shown in FIGS. 1 and 2.

Moreover, the digital broadcast reception apparatus 100 is connected to a display apparatus 200 and a sound output apparatus 300.

The antenna 1 is, for example, a parabolic antenna, a UHF antenna, or the like, and receives a broadcast wave including a digital broadcast signal of a ground wave digital broadcast, a broadcasting satellite (BS) broadcast, a communications satellite (CS) broadcast, or the like to output a radio frequency (RF) signal such as a ground wave digital signal, a BS broadcast signal, a CS broadcast signal, or the like to the tuner unit 2. Incidentally, if a digital broadcast wave is received through a CATV circuit, a connection cable (not shown) and the like may be equipped. Moreover, for example, the broadcast data of a physical channel included in a digital broadcast wave is multiplexed by the MPEG2-TS system.

The tuner unit 2 includes a mixer (not shown), a tuning circuit (not shown), an A/D conversion circuit (not shown), and the like. An RF signal input from the antenna 1 is converted to an intermediate frequency (IF) signal of a channel that a user desires by the mixer, the tuning circuit, and the like, and the generated IF signal is converted into digital data by the A/D conversion circuit.

The demodulation unit 3, for example, performs the demodulation processing and the like to the digital data input from the tuner unit 2, and outputs the demodulated data to the separation unit 4.

The separation unit 4, for example, separates the digital data input from the demodulation unit 3 into video data, audio data, and Program Specific Information/Service Information (PSI/SI), and outputs the separated data to the decoder 5.

The decoder 5 performs the decode processing to the video data and the audio data input from the separation unit 4, and outputs the decoded data to the display apparatus 200 and the sound output apparatus 300.

The remote control reception circuit 6, for example, outputs an operation signal output from the remote control R to the control unit 10. To put it more concretely, the remote control reception circuit 6 converts an infrared signal from the remote control R into an electric signal to output the electric signal to the control unit 10.

The remote control R is equipped with, for example, various keys and the like for inputting various operation signals, and outputs various operation signals to the control unit 10 through the remote control reception circuit 6 by an operation of a user.

To put it more concretely, the remote control R is equipped with an arrow key or the like for performing the up/down tuning of a subchannel, and outputs an operation signal for performing the up/down tuning of the subchannel to the control unit 10 through the remote control reception circuit 6 by a user's operation of the arrow key.

The control unit 10 includes a central processing unit (CPU) 7, a random access memory (RAM) 8, a storage unit 9, and the like as shown in FIG. 2, and is connected to the tuner unit 2, the demodulation unit 3, the separation unit 4, the decoder 5, the remote control reception circuit 6, and the like to perform the control of each unit of the digital broadcast reception apparatus 100.

The CPU 7 reads a processing program or the like stored in the storage unit 9, and expands the read program into the RAM 8 to execute the expanded program. The CPU 7 thereby performs the control of the whole digital broadcast reception apparatus 100.

The RAM 8 expands the processing program or the like executed by the CPU 7 into a program storage region in the RAM 8, and stores input data, the processing results produced at the time of the execution of the processing program, and the like into a data storage region.

The storage unit 9, for example, includes a recording medium (not shown) in which programs, data, and the like are previously stored, and the recording medium is made of, for example, a semiconductor memory or the like. Moreover, the storage unit 9 stores various pieces of data and various processing programs for enabling the CPU 7 to realize the function of controlling the whole digital broadcast reception apparatus 100, and the data processed by the execution of these programs and the like. To put it more concretely, the storage unit 9, for example, stores a PTM obtainment program 9A, a judgment PID obtainment program 9B, a judgment packet obtainment program 9C, a first scramble judgment program 9D, a second scramble judgment program 9E, a packet head detection program 9F, a third scramble judgment program 9G, a head position detection program 9H, a fourth scramble judgment program 9I, a fifth scramble judgment program 9J, a tuning control program 9K, and the like as shown in FIG. 2.

The PTM obtainment program 9A is a program for enabling the CPU 7 to realize, for example, the function of obtaining a program map table (PMT) from the PSI/SI separated by the separation unit 4.

The judgment PID obtainment program 9B is a program for enabling the CPU 7 to realize, for example, the function of obtaining the PID equivalent to a PCR_PID among VIDEO_PIDs and AUDIO_PIDs in the PMT obtained by the execution of the PTM obtainment program 9A as a judgment PID. To put it more concretely, the judgment PID obtainment program 9B is a program enabling CPU 7 to realize, for example, the function of judging whether a VIDEO_PID equivalent to the PCR_PID exists in the PMT or not, of obtaining the VIDEO_PID equivalent to the PCR_PID as the judgment PID if the CPU 7 judges that the VIDEO_PID exists, of judging whether an AUDIO_PID equivalent to the PCR_PID exists in the PMT or not if the CPU 7 judges that the VIDEO_PID equivalent to the PCR_PID does not exists, of obtaining the AUDIO_PID equivalent to the PCR_PID as the judgment PID if the CPU 7 judges that the AUDIO_PID exists, and of obtaining the VIDEO_PID as the judgment PID if the CPU 7 judges that the AUDIO_PID equivalent to the PCR_PID does not exist. The CPU 7 functions as a judgment PID obtainment unit by executing the judgment PID obtainment program 9B like this.

The judgment packet obtainment program 9C is a program enabling the CPU 7 to realize, for example, the function of obtaining a TS packet corresponding to the judgment PID obtained by the execution of the judgment PID obtainment program 9B from the broadcast data of a subchannel as the judgment packet. The CPU 7 functions as a judgment packet obtainment unit by executing the judgment packet obtainment program 9C like this.

The first scramble judgment program 9D is a program enabling the CPU 7 to realize, for example, the function of timing a time from a start of the obtainment operation of the judgment packet by the execution of the judgment packet obtainment program 9C, of judging whether the judgment packet has been obtained in a previously set first time or not, and of judging that the broadcast data of the subchannel is scrambled when the CPU 7 judges that the judgment packet has not been obtained in the first time. The CPU 7 functions as a first scramble judgment unit by executing the first scramble judgment program 9D like this.

The second scramble judgment program 9E is a program enabling the CPU 7 to realize, for example, the function of judging whether the transport_scrambling_control bits (hereinafter referred to as tsc bits) of a judgment packet are 0x0 or not when the CPU 7 executes the first scramble judgment program 9D to judge that the obtainment of the judgment packet by the execution of the judgment packet obtainment program 9C has been performed within the first time, and of judging that the broadcast data of the subchannel is scrambled when the CPU 7 judges that the tsc bits of the judgment packet are ones other than 0x0. The CPU 7 functions as a second scramble judgment unit by executing the second scramble judgment program 9E like this.

The packet head detection program 9F is a program enabling the CPU 7 to realize, for example, the function of detecting a PES packet having a payload_unit_start_indicator of 1 when the CPU 7 executes the second scramble judgment program 9E to judge that the tsc bits are 0x0. The CPU 7 functions as a packet head detection unit by executing the packet head detection program 9F like this.

The third scramble judgment program 9G is a program enabling the CPU 7 to realize, for example, the function of timing a time from the start of the detection operation of the PES packet having the payload_unit_start_indicator of 1 by the execution of the packet head detection program 9F, of judging whether the PES packet has been detected in a previously set second time or not, and of judging that the broadcast data of the subchannel is scrambled when the PES packet has not been detected in the second time. The CPU 7 functions as a third scramble judgment unit by executing the third scramble judgment program 9G like this.

The head position detection program 9H is a program enabling the CPU 7 to realize, for example, the function of detecting the packet_start_code_prefix of a PES packet when the CPU 7 judges that the PES packet having the payload_unit_start_indicator of 1 has been detected in the second time by the execution of the third scramble judgment program 9G. The CPU 7 functions as a head position detection unit by executing the head position detection program 9H like this.

The fourth scramble judgment program 9I is a program enabling the CPU 7 to realize; for example, the function of judging whether the packet_start_code_prefix detected by the execution of the head position detection program 9H is 0x000001 or not, and of judging that the broadcast data of the subchannel is scrambled when the CPU 7 judges that the packet_start_code_prefix is one other than 0x000001. The CPU 7 functions as a fourth scramble judgment unit by executing the fourth scramble judgment program 9I like this.

The fifth scramble judgment program 9J is a program enabling the CPU 7 to realize, for example, the function of judging whether the PES (Packetized Elementary Stream)_scrambling_control is 0x0 or not when the CPU 7 judges that the packet_start_code_prefix is 0x000001 by the execution of the fourth scramble judgment program 9I, of judging that the broadcast data of the subchannel is scrambled when the CPU 7 judges that the PES_scrambling_control is one other than 0x0, and of judging that the broadcast data of the subchannel is not scrambled when the CPU 7 judges that the PES_scrambling_control is 0x0. The CPU 7 functions as a fifth scramble judgment unit by executing the fifth scramble judgment program 9J like this.

The tuning control program 9K is a program enabling the CPU 7 to realize, for example, the function of performing the scramble judgment processing of the broadcast data of the subchannel by the PTM obtainment program 9A, the judgment PID obtainment program 9B, the judgment packet obtainment program 9C, the first scramble judgment program 9D, the second scramble judgment program 9E, the packet head detection program 9F, the third scramble judgment program 9G, the head position detection program 9H, the fourth scramble judgment program 9I, and the fifth scramble judgment program 9J at the time of tuning the subchannel from the broadcast data of a digital broadcast, of tuning the subchannel upper or lower than the subchannel by one when the CPU 7 judges that the broadcast data of the subchannel is scrambled by the scramble judgment processing, and of outputting the broadcast data of the subchannel to the decoder 5 when the CPU 7 judges that the broadcast data of the subchannel is not scrambled.

To put it more concretely, the tuning control program 9K is the program enabling the CPU 7 to realize, for example, the function of tuning the subchannel upper or lower than the presently tuned subchannel by one when a user operates the remote control R to input an operation signal of performing the up/down tuning of a subchannel through the remote control reception circuit 6, of performing the scramble judgment processing of the broadcast data of the tuned subchannel, of tuning the subchannel upper or lower than the subchannel by one when the CPU 7 judges that the broadcast data of the subchannel is scrambled by the scramble judgment processing, and of outputting the broadcast data of the subchannel to the decoder 5 when the CPU 7 judges that the broadcast data of the subchannel is not scrambled.

The CPU 7 functions as a tuning control unit by executing the tuning control program 9K like this.

Figure 3:
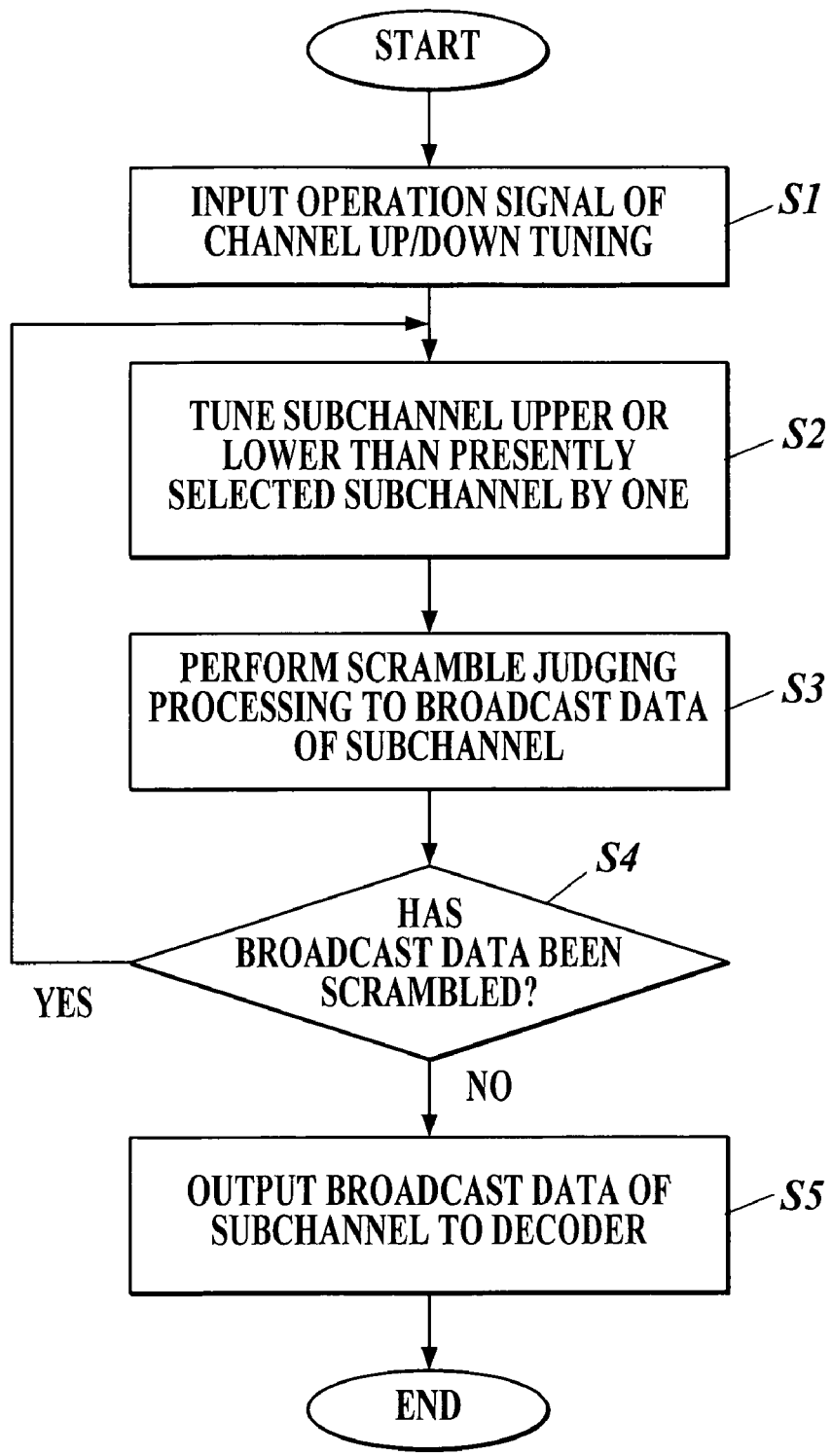
FIG. 3 is a flow chart illustrating an example of the tuning operation in a digital broadcast recording apparatus according to the present embodiment.

Next, an example of the tuning operation of the digital broadcast reception apparatus 100 according to the present invention having the configuration mentioned above will be described with reference to the flow chart shown in FIG. 3.

First, when a user operates the remote control R to input an operation signal instructing the performance of the up/down tuning of a subchannel through the remote control reception circuit 6 (step S1), the CPU 7 executes the tuning control program 9K to tune the subchannel upper or lower than the presently tuned subchannel by one (step S2).

Next, the CPU 7 performs the scramble judgment processing of the broadcast data of the subchannel tuned at the step S2 (step S3).

Next, the CPU 7 judges whether the broadcast data of the subchannel is scrambled or not based on the execution of the tuning control program 9K (step S4).

When the CPU 7 judges that the broadcast data of the subchannel is scrambled at the step S4 (step S4: Yes), the CPU 7 returns the processing to that at the step S2 without outputting the broadcast data of the subchannel to the decoder 5.

When the CPU 7 judges that the broadcast data of the subchannel is not scrambled at the step S4 (step S4: No), the CPU 7 outputs the broadcast data of the subchannel to the decoder 5 (step S5), and ends the present processing.

Figure 4:
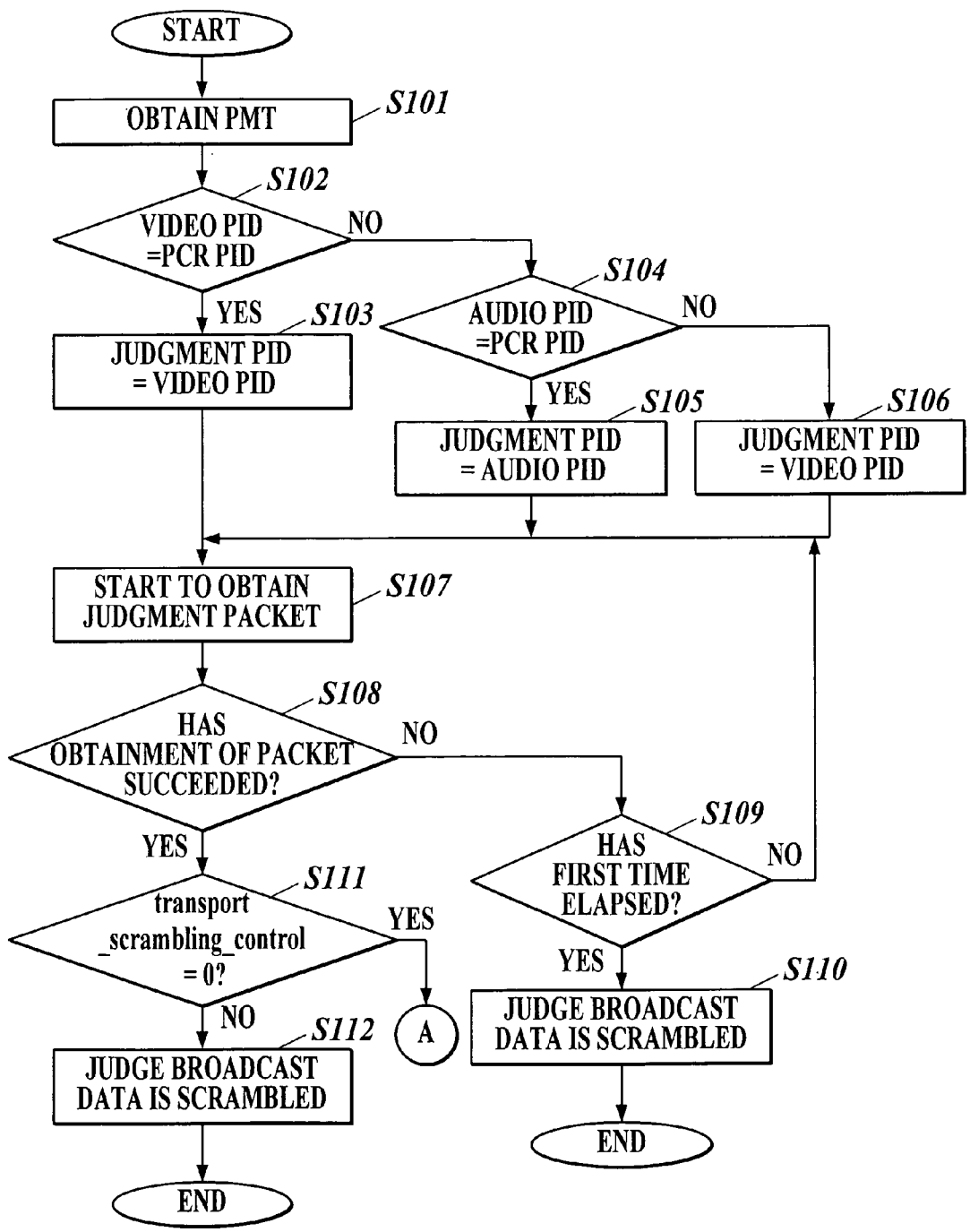
FIG. 4 is a flow chart illustrating an example of the scramble judgment processing operation in the digital broadcast recording apparatus according to the present embodiment.
Figure 5:
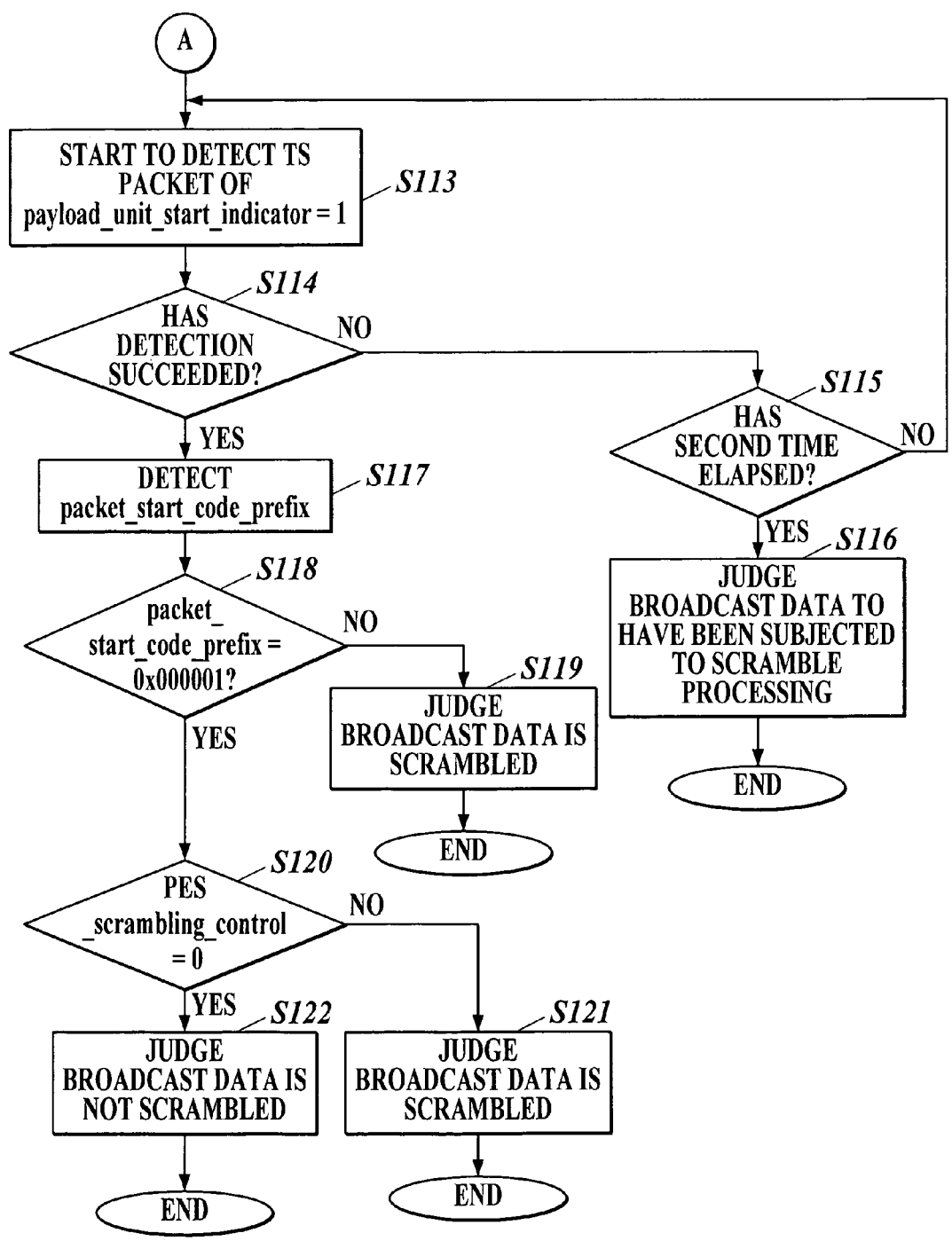
FIG. 5 is a flow chart illustrating a part of the example of the scramble judgment processing operation in the digital broadcast recording apparatus according to the present embodiment.

Next, an example of the scramble judgment processing operation of the digital broadcast reception apparatus 100 according to the present invention will be described with reference to the flow charts shown in FIGS. 4 and 5.

First, the CPU 7 executes the PTM obtainment program 9A to obtain a program map table (PMT) from the PSI/IS separated by the separation unit 4 (step S101).

Next, the CPU 7 executes the judgment PID obtainment program 9B to judge whether a VIDEO_PID equivalent to the PCR_PID exists in the PMT obtained by the execution of the PTM obtainment program 9A or not (step S102).

When the CPU 7 judges that the VIDEO_PID equivalent to the PCR_PID exists at the step S102 (step S102: Yes), the CPU 7 obtains the VIDEO_PID as the judgment PID (step S103).

When the CPU 7 judges that the VIDEO_PID equivalent to the PCR_PID does not exist at the step S102 (step S102: No), the CPU 7 judges whether an AUDIO_PID equivalent to the PCR_PID exists in the PMT or not based on the execution of the judgment PID obtainment program 9B (step S104).

When the CPU 7 judges that the AUDIO_PID equivalent to the PCR_PID exists at the step S104 (step S104: Yes), the CPU 7 obtains the AUDIO_PID as the judgment PID (step S105).

When the CPU 7 judges that the AUDIO_PID equivalent to the PCR_PID does not exist at the step S104 (step S104: No), the CPU 7 obtains a VIDEO_PID as the judgment PID (step S106).

Next, the CPU 7 executes the judgment packet obtainment program 9C to start the operation of obtaining a TS packet corresponding to the judgment PID obtained from the broadcast data of the subchannel by the execution of the judgment PID obtainment program 9B as the judgment packet (step S107).

Next, the CPU 7 executes the first scramble judgment program 9D to time the time from the start of the obtainment operation of the judgment packet by the execution of the judgment packet obtainment program 9C, and judges whether the obtainment of the judgment packet has succeeded or not (step S108).

When the CPU 7 judges that the obtainment of the judgment packet has not succeeded at the step S108 (step S108: No), the CPU 7 judges whether a predetermined time has elapsed from the start of the timing at the step S108 or not (step S109).

When the CPU 7 judges that the predetermined time has not elapsed from the start of the timing at the step S108 at the step S109 (step S109: No), the CPU 7 returns the processing to the step S107.

When the CPU 7 judges that the predetermined time has elapsed from the start of the timing at the step S108 at the step S109 (step S109: Yes), the CPU 7 judges that the broadcast data of the subchannel is scrambled (step S110), and ends the present processing.

When the CPU 7 judges that the obtainment of the judgment packet has succeeded at the step S108 (step S108: Yes), the CPU 7 executes the second scramble judgment program 9E to judge whether the tsc bits of the judgment packet are 0x0 or not (step S111).

When the CPU 7 judges that the tsc bits of the judgment packet are ones other than 0x0 at the step S111 (step S111: No), the CPU 7 judges that the broadcast data of the subchannel is scrambled (step S112), and ends the present processing.

When the CPU 7 judges that the tsc bits of the judgment packet are 0x0 at the step S111 (step S111: Yes), the CPU 7 executes the packet head detection program 9F to start the operation of detecting the PES packet having the payload_unit_start_indicator of 1 (step S113).

Next, the CPU 7 executes the third scramble judgment program 9G to time the time from the start of the detection operation of the PES packet having the payload_unit_start_indicator of 1 by the execution of the packet head detection program 9F, and to judge whether the detection of the PES packet has succeeded or not (step S114).

When the CPU 7 judges that the detection of the PES packet has not succeeded at the step S114 (step S114: No), the CPU 7 judges whether the previously set second time has elapsed or not from the start of the timing at the step S114 (step S115).

When the CPU 7 judges that the second time has not elapsed from the start of the timing at the step S114 at the step S115 (step S115: No), the CPU 7 returns the processing to the step S113.

When the CPU 7 judges that the second time has elapsed from the start of the timing at the step S114 at the step S115 (step S115: Yes), the CPU 7 judges that the broadcast data of the subchannel is scrambled (step S116), and ends the present processing.

When the CPU 7 judges that the detection of the PES packet has succeeded at the step S114 (step S14: Yes), the CPU 7 executes the head position detection program 9H to detect the packet_start_code_prefix of the PES packet (step S117).

Next, the CPU 7 executes the fourth scramble judgment program 9I to judge whether the packet_start_code_prefix detected at the step S117 is 0x000001 or not (step S118).

When the CPU 7 judges that the packet_start_code_prefix is one other than 0x000001 at the step S118 (step S118: No), the CPU 7 judges that the broadcast data of the subchannel is scrambled based on the execution of the fourth scramble judgment program 9I (step S119).

When the CPU 7 judges that the packet_start_code_prefix is 0x000001 at the step S118 (step S118: Yes), the CPU 7 executes the fifth scramble judgment program 9J to judge whether the PES_scrambling_control is 0x0 or not (step S120).

When the CPU 7 judges that the PES_scrambling_control is one other than 0x0 at the step S120 (step S120: No), the CPU 7 judges that the broadcast data of the subchannel is scrambled (step S121), and ends the present processing.

When the CPU 7 judges that the PES_scrambling_control is 0x0 at the step S120 (step S120: Yes), the CPU 7 judges that the broadcast data of the subchannel is not scrambled (step S122), and ends the present processing.

In the digital broadcast reception apparatus 100 according to the present invention mentioned above, the CPU 7 executes the judgment PID obtainment program 9B to obtain a PID equivalent to the PCR_PID as a judgment PID among the VIDEO_PIDs and the AUDIO_PIDs in a program map table (PMT) of the broadcast data of a subchannel of a digital broadcast; the CPU 7 executes the judgment packet obtainment program 9C to obtain a TS packet corresponding to the judgment PID obtained from the broadcast data of the subchannel by the execution of the judgment PID obtainment program 9B as a judgment packet; the CPU 7 executes the first scramble judgment program 9D to judge whether the judgment packet has been obtained or not in a first time from the start of the obtainment operation of the judgment packet by the execution of the judgment packet obtainment program 9C; if the CPU 7 judges that the judgment packet has not obtained in the first time, the CPU 7 judges that the broadcast data of the subchannel is scrambled; if the CPU 7 judges that the judgment packet has been obtained in the first time by the execution of the first scramble judgment program 9D, the CPU 7 executes the second scramble judgment program 9E to judges whether the transport_scrambling_control bits of the judgment packet are 0x0 or not; if the CPU 7 judges that the transport_scrambling_control bits of the judgment packet are ones other than 0x0, the CPU 7 judges that the broadcast data of the subchannel is scrambled; if the CPU 7 judges that the transport_scrambling_control bits of the judgment packet are 0x0 by the execution of the second scramble judgment program 9E, the CPU 7 executes the packet head detection program 9F to detect a PES packet having the payload_unit_start_indicator of 1; the CPU 7 executes the third scramble judgment program 9G to judge whether the PES packet has been detected or not in a second time from the start of the detection operation of the PES packet by the packet head detection program 9F; if the CPU 7 judges that the PES packet has not been detected in the second time, the CPU 7 judges that the broadcast data of the subchannel is scrambled; if the CPU 7 judges that the PES packet has been detected by the execution of the third scramble judgment program 9G, the CPU 7 executes the head position detection program 9H to detect the packet_start_code_prefix of the PES packet; if the CPU 7 judges that the packet_start_code_prefix detected by the execution of the head position detection program 9H is one other than 0x000001, the CPU 7 executes the fourth scramble judgment program 9I to judge that the broadcast data of the subchannel is scrambled; if the CPU 7 executes the fourth scramble judgment program 9I to judge that the packet_start_code_prefix detected by the execution of the head position detection program 9H is 0x000001, the CPU 7 executes the fifth scramble judgment program 9J to judge whether the PES (Packetized Elementary Stream)_scrambling_control is 0x0 or not; if the CPU 7 judges that the PES_scrambling_control is one other than 0x0, the CPU 7 judges that the broadcast data of the subchannel is scrambled; and if the CPU judges that the PES_scrambling_control is 0x0, the CPU 7 judges that the broadcast data of the subchannel is not scrambled. Consequently, the digital broadcast reception apparatus 100 can exactly detect whether the broadcast data of a subchannel is scrambled or not. Moreover, even if the broadcast data of the subchannel is not decoded, it can be confirmed whether the broadcast data is scrambled or not, and consequently the performance of the scramble processing can be more rapidly detected.

Moreover, the CPU 7 executes the tuning control program 9K to perform the scramble judgment processing of the broadcast data of a subchannel by the execution of the judgment PID obtainment program 9B, the judgment packet obtainment program 9C, the first scramble judgment program 9D, the second scramble judgment program 9E, the packet head detection program 9F, the third scramble judgment program 9G, the head position detection program 9H, the fourth scramble judgment program 9I, and the fifth scramble judgment program 9J at the time of the tuning of the subchannel from the broadcast data of a digital broadcast. If the CPU 7 judges that the broadcast data of the subchannel is scrambled by the scramble-judgment processing, the CPU 7 tunes the subchannel upper or lower than the subchannel by one. Consequently, only the non-scrambled subchannel is processed by decode processing, and then the time of performing the decode processing of the scrambled broadcast data of the subchannel can be reduced.

Incidentally, although the up/down tuning of a subchannel has been exemplified as the case of performing the scramble judgment processing in the present embodiment, the present invention is not limited to this example. For example, the scramble judgment processing according to the present invention may be performed when a predetermined subchannel is tuned, or the scramble judgment processing according to the present invention may be performed at the time of the auto scan of a subchannel.

The entire disclosure of Japanese Patent Application No. 2006-175433 filed on Jun. 26, 2006, including description, claims, drawings and summary are incorporated herein by reference.

What is claimed is:

1. A digital broadcast reception apparatus receiving broadcast data of a digital broadcast, comprising:
a processor; and
a control unit including a judgment PID obtainment unit, a judgment packet obtainment unit, a first scramble judgment unit, a second scramble judgment unit, a packet head detection unit, a third scramble judgment unit, a head position detection unit, a fourth scramble judgment unit, a fifth scramble judgment unit, and a tuning control unit, the control unit operatively configured to
obtain, by the judgment PID obtainment unit, a PID equivalent to a PCR_PID as a judgment PID, among a VIDEO_PID and an AUDIO_PID in a program map table (PMT) of broadcast data of a subchannel of the digital broadcast;
obtain, by the judgment packet obtainment unit, a TS packet corresponding to the judgment PID obtained by the judgment PID obtainment unit from the broadcast data of the subchannel as a judgment packet;
judge, by the first scramble judgment unit, whether or not the judgment packet is obtained by the judgment packet obtainment unit within a first time after the judgment packet obtainment unit starts obtaining the judgment packet, wherein when the first scramble judgment unit judges that the judgment packet has not obtained within the first time, the first scramble judgment unit judges that the broadcast data of the subchannel is scrambled;
judge, by the second scramble judgment unit, whether transport_scrambling_control bits of the judgment packet are 0x0 or not when the first scramble judgment unit judges that the judgment packet has been obtained in the first time by the judgment packet obtainment unit, wherein when the second scramble judgment unit judges that the transport_scrambling_control bits of the judgment packet are other than 0x0, the second scramble judgment unit judges that the broadcast data of the subchannel is scrambled;
detect, by the packet head detection unit, a PES packet having a payload_unit_start_indicator of 1 when the second scramble judgment unit judges that the transport_scrambling_control bits of the judgment packet are 0x0;
judge, by the third scramble judgment unit, whether or not the PES packet is detected by the packet head detection unit within a second time after the packet head detection unit starts the detection of the PES packet, wherein when the third scramble judgment unit judges that the PES packet has not been detected within the second time, the third scramble judgment unit judges that the broadcast data of the subchannel is scrambled;
detect, by the head position detection unit, a packet_start_code_prefix of the PES packet when the third scramble judgment unit judges that the PES packet has been detected within the second time;
judge, by the fourth scramble judgment unit, that the broadcast data of the subchannel is scrambled when the packet_start_code_prefix detected by the head position detection unit is other than 0x000001;
judge, by the fifth scramble judgment unit, whether PES_scrambling_control is 0x0 or not when the fourth scramble judgment unit judges that the packet_start_code_prefix detected by the head position detection unit is 0x000001, wherein when the fifth scramble judgment unit judges that the PES_scrambling_control is other than 0x0, the fifth scramble judgment unit judges that the broadcast data of the subchannel is scrambled, and when the fifth scramble judgment unit judges that the PES_scrambling_control is 0x0, the fifth scramble judgment unit judges that the broadcast data of the subchannel is non-scrambled; and control, by the tuning control unit, the judgment PID obtainment unit, the judgment packet obtainment unit, the first scramble judgment unit, the second scramble judgment unit, the packet head detection unit, the third scramble judgment unit, the head position detection unit, the fourth scramble judgment unit, and the fifth scramble judgment unit, so as to perform a scramble judgment at a time of tuning the subchannel from the broadcast data of the digital broadcast, wherein when the tuning control unit judges by the scramble judgment that the broadcast data of the subchannel is scrambled, the tuning control unit tunes a subchannel upper or lower by one than the subchannel.

2. A digital broadcast reception apparatus method, comprising:

obtaining, by a judgment PID obtainment unit, a PID equivalent to a PCR_PID as a judgment PID, among a VIDEO_PID and an AUDIO_PID in a program map table (PMT) of broadcast data of a subchannel of the digital broadcast;

obtaining, by a judgment packet obtainment unit, a TS packet corresponding to the judgment PID obtained by the judgment PID obtainment unit from the broadcast data of the subchannel as a judgment packet;

judging, by a first scramble judgment unit, whether or not the judgment packet is obtained by the judgment packet obtainment unit within a first time after the judgment packet obtainment unit starts obtaining the judgment packet, wherein when the first scramble judgment unit judges that the judgment packet has not obtained within the first time, the first scramble judgment unit judges that the broadcast data of the subchannel is scrambled;

judging, by a second scramble judgment unit, whether transport_scrambling_control bits of the judgment packet are 0x0 or not when the first scramble judgment unit judges that the judgment packet has been obtained in the first time by the judgment packet obtainment unit, wherein when the second scramble judgment unit judges that the transport_scrambling_control bits of the judgment packet are other than 0x0, the second scramble judgment unit judges that the broadcast data of the subchannel is scrambled;

detecting, by a packet head detection unit, a PES packet having a payload_unit_start_indicator of 1 when the second scramble judgment unit judges that the transport_scrambling_control bits of the judgment packet are 0x0;

judging, by a third scramble judgment unit, whether or not the PES packet is detected by the packet head detection unit within a second time after the packet head detection unit starts the detection of the PES packet, wherein when the third scramble judgment unit judges that the PES packet has not been detected within the second time, the third scramble judgment unit judges that the broadcast data of the subchannel is scrambled;

detecting, by a head position detection unit a packet_start_code_prefix of the PES packet when the third scramble judgment unit judges that the PES packet has been detected within the second time;

judging, by a fourth scramble judgment unit, that the broadcast data of the subchannel is scrambled when the packet_start_code_prefix detected by the head position detection unit is other than 0x000001;

judging, by a fifth scramble judgment unit whether PES_scrambling_control is 0x0 or not when the fourth scramble judgment unit judges that the packet_start_code_prefix detected by the head position detection unit is 0x000001, wherein when the fifth scramble judgment unit judges that the PES_scrambling_control is other than 0x0, the fifth scramble judgment unit judges that the broadcast data of the subchannel is scrambled, and when the fifth scramble judgment unit judges that the PES_scrambling_control is 0x0, the fifth scramble judgment unit judges that the broadcast data of the subchannel is non-scrambled; and controlling, by a tuning control unit, the judgment PID obtainment unit, the judgment packet obtainment unit, the first scramble judgment unit, the second scramble judgment unit, the packet head detection unit, the third scramble judgment unit, the head position detection unit, the fourth scramble judgment unit, and the fifth scramble judgment unit, so as to perform a scramble judgment at a time of tuning the subchannel from the broadcast data of the digital broadcast, wherein when the tuning control unit judges by the scramble judgment that the broadcast data of the subchannel is scrambled, the tuning control unit tunes a subchannel upper or lower by one than the subchannel.

* * * * *